Patented Sept. 7, 1937

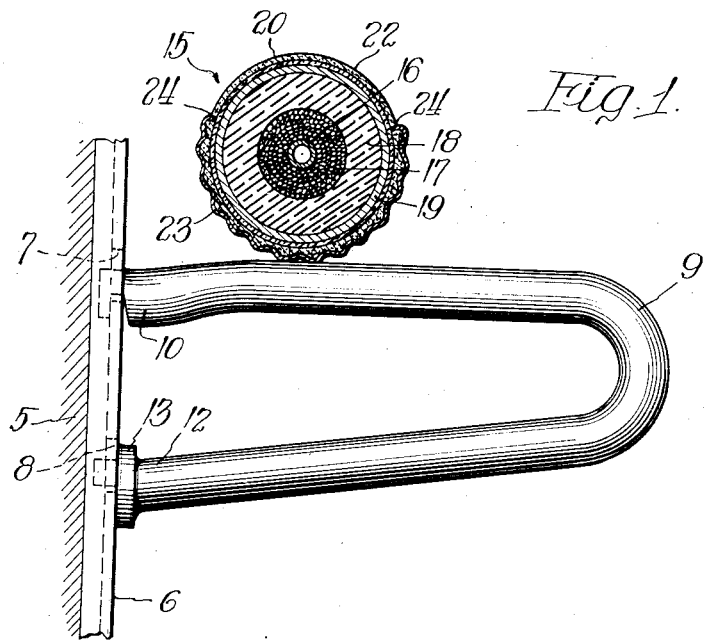
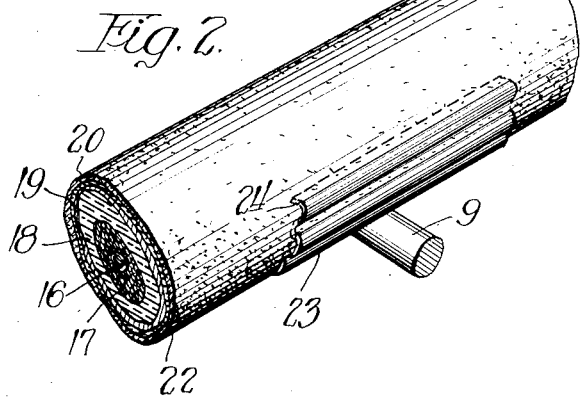
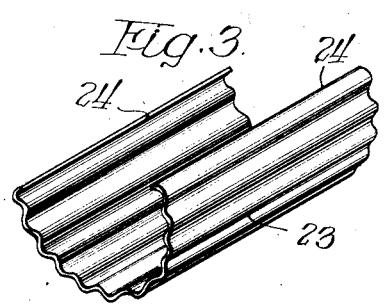

2,092,270

UNITED STATES PATENT OFFICE 2,092,270

CABLE PROTECTOR

Louis I. Anderson, Chicago, Ill.

Original application October 19, 1933, Serial No. 694,236, now Patent No. 2,059,429, November 3, 1936. Divided and this application April 28, 1934, Serial No. 722,911.

1 Claim. (Cl. 173—266)

This invention relates to cable protectors, and more particularly to cable protectors for preventing the external surface of the cable sheath from becoming abraded or worn through due to movement of the cable over a supporting cable arm.

The present invention is a division of my copending application, Serial No. 694,236, filed October 19, 1933, which has matured to Patent No. 2,059,429 dated November 3, 1936 and is directed to the cable protector shield for use in connection with the cable rack disclosed in that application, although its use is not limited to this particular application.

In the transmission of electrical energy by conductors carried within suitable cables, it has become customary to support relatively long runs of cable upon suitable racks or projecting supporting arms, the racks, in turn, being anchored to a wall or the like. The cables employed are relatively large in diameter and of appreciable weight per foot of length. Such cables preferably have an outer enclosing body of asbestos felt, or a similar wrapping, over which is applied a layer of cementitious material or other plastic material for fire-proofing the cable. The asbestos felt wrapping may be omitted, if desired. Lead-sheathed cables are usually employed.

Due to the expansion and contraction of the cable with temperature changes, as well as creeping or warping tendencies of the cable due to inherent stresses therein, there is considerable relative movement between the cable and the supporting rack. Over a period of time this movement may become sufficient to wear away the cementitious layer and asbestos wrapping of the cable, cutting into the lead sheath, thereby destroying its insulating properties and rendering the conductor pervious to moisture and the like.

It is an object of the present invention to provide a shield member interposed between the cable surface and the supporting arm of the rack, whereby movement of the cable on the bracket is not restricted, and the shield member effectively prevents wearing away or abrasion of the cable sheath.

Another object of the present invention is to provide a cable protector or shield which requires no extraneous securing means for fixing it in position, and which can be mounted upon the cable at any desired point.

An important advantage secured by the present invention is the provision of a simple, economical and easily assembled cable protector, of requisite strength for the requirements to which it is subjected, and which can be formed by a single metal-working operation.

Other objects and advantages of the present invention will appear more fully from the following detailed description, which, taken in connection with the accompanying drawing, will disclose to those skilled in the art the particular construction and operation of a preferred form of my invention.

In the drawing:

Figure 1 is a side elevational view of a cable rack with a cable supported thereon, the cable being shown in section with the protector shield thereabout;

Figure 2 is a perspective view of the cable shown in Figure 1, showing the manner in which the protecting shield extends across the cable rack arm; and Figure 3 is a perspective detail view of the cable protector itself.

Referring now in detail to Figure 1, I have indicated therein a wall 5, which may be the side wall of a manhole chamber, or a similar wall along which the cable is adapted to extend. Anchored in any suitable manner to the wall 5 is a supporting channel indicated at 6, which is provided with suitably formed openings 7 and 8 adapted to receive the two ends of the cable rack indicated generally at 9.

This cable rack is shown in detail in my aforementioned copending application, Serial No. 694,236, filed October 19, 1933, and it is not believed that a detailed description of the same is necessary, in that any desired type of cable rack may be employed.

Suffice it to say that the cable rack is supported in the position shown in Figure 1 by interlocking engagement of the ends 10 and 12 thereof with the supporting channel 6, the end 12 being provided with an annularly extending flange portion 13 providing a bearing surface to withstand compression stresses imparted to the lower arm of the cable rack. The upper end 10 of the cable rack 9 is clamped in the opening 7, substantially as shown.

Referring now in detail to the cable indicated generally by the reference numeral 15, this cable may be of any desired form, and in the illustrated embodiment of my invention comprises a central core member 16, having disposed thereabout a plurality of conductors 17 which are engaged within suitable insulating material 18. The insulating material 18 is provided with a protecting sheath or coating extending thereabout, indicated at 19, such as the lead sheath commonly employed, about which is adapted to be wrapped a layer of asbestos felt 20, or a similar wrapping, although this wrapping may be omitted, if desired, for completely enclosing the cable and for fire-proofing the same.

Over the wrapping 20 I provide a layer of cementitious or other plastic material, indicated at 22, which is heat insulating and also fire-resistant, and which is placed upon the cable in a plastic state and then subsequently hardened and dried to form a hard impervious covering about the cable.

It is apparent that if the cable were allowed to rest upon the cable rack 9 without any protecting means between the surface of the cementitious or heat-insulating layer 22 and the cable arm, any relative movement between the cable and the rack would result in wearing away of this material, subsequent wearing away of the asbestos wrapping and consequent destruction of the enclosing sheath for the cable.

As shown, I have provided a semi-cylindrical axially-extending corrugated protector for the cable, indicated generally by the reference numeral 23, which is applied to the conductor while the cementitious layer 22 is still in the plastic state. With this fire-proofing layer unset, the shield member may be embedded or keyed therein, as clearly shown in Figure 1, and results in providing a shield or protector which is engaged upon the upper surface of the bracket 9, and serves as a bearing for both lateral and longitudinal movement of the cable 15. Thus, I prevent the fireproof layer 22 of the cable from coming into direct contact with the cable rack, and, by corrugating the shield member 23, a substantial amount of the metal must be worn away before the shield loses its protective effect as a bearing member between the bracket and the cable sheath.

Actual tests have shown that the shield member will ordinarily outlast the life of the cable, and consequently will more than adequately protect the cable surface 22 during the life of the cable.

These cable protectors or shields 23 are adapted to be spaced along the cable directly above the cable racks or supporting frames, and thus the cable is allowed to move freely upon the bracket portions of the racks, and the friction of such movement is entirely taken up by the shield 23 and the cable bracket, thus eliminating any wear upon the cable or its insulating covering.

It is to be noted that the corrugations allow the shield member 23 to be firmly set and embedded in the fire-proof layer 22, and the upper extending ends 24 of the shield member are turned inwardly to resist any possible angular movement of the shield 23 with respect to the cable. This, in conjunction with the corrugations, eliminates the necessity of any extraneous securing means.

It is apparent that the shield may be made of any desired length, sufficient to extend over the entire range of relative movement between the cable rack 9 and the cable 15, and that by reason of the corrugations, only a small line contact between the cable rack and the shield is provided, which eliminates to a large extent any frictional resistance to movement of the cable, which is undesirable, and at the same time allows for little or no wear upon the shield. The shield is peculiarly adapted for heavy spans of cable between the supporting arms, and for this reason must be of generally cylindrical form and relatively long with respect to the width of the supporting arm to accommodate the longitudinal play in the cable. The corrugations in the shield give an appreciable depth of shielding metal, provide greater local stiffness at the point of contact with the support, prevent any localizing denting and thus eliminate hooking of the cable over the arm, and also provide a keying effect preventing shifting of the shield relative to the cable upon longitudinal movement of the cable with respect to the arm.

Further, it is to be noted that no means are required outside of the shield member 23 itself in order to secure the shield to the cable, and the shield 23 may be secured at any desired position along the axis of the cable, depending upon the spacing of the cable bracket 9. Thus, adjustment and ease of assembly are provided, and since the cable shield 23 may comprise only a thin sheet metal stamping, only a single stamping or rolling operation need be required to form the same, which renders the protector simple and economical to manufacture.

Having described my invention in accordance with the patent statutes, what I claim as new and desire to secure by Letters Patent is:

An insulated electric cable adapted to be supported on a rigid transversely extending small diameter arm, said cable having a generally semi-cylindrical metallic shield over the external surface thereof which is relatively long with respect to the width of the supporting arm, said shield being transversely corrugated with the inner surfaces of the corrugations embedded in the insulation to stiffen the shield against localized transverse denting over the arm and to provide an increased thickness of metal for wear purposes during longitudinal movement of the cable relative to the arm, said shield having radially inwardly extending substantially coplanar longitudinal edges embedded in said insulation to key said shield to said cable and to prevent relative movement therebetween.

LOUIS I. ANDERSON.